United States Patent
Phillips et al.

(10) Patent No.: US 6,915,198 B2
(45) Date of Patent: Jul. 5, 2005

(54) VEHICLE FAST TORQUE COORDINATION

(75) Inventors: Anthony Mark Phillips, Northville, MI (US); Diana Yanakiev, Canton, MI (US); Bengt Norén, Molndal (SE); Jonas Jerrelind, Goteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/605,150

(22) Filed: Sep. 11, 2003

(65) Prior Publication Data

US 2005/0060080 A1 Mar. 17, 2005

(51) Int. Cl.[7] .................................................. G06F 7/00
(52) U.S. Cl. ........................................................ 701/54
(58) Field of Search .............................. 701/51, 58, 61

(56) References Cited

U.S. PATENT DOCUMENTS

| | | |
|---|---|---|
| 5,351,776 A | 10/1994 | Keller et al. |
| 5,367,456 A | 11/1994 | Summerville et al. |
| 5,513,107 A | 4/1996 | Gormley |
| 5,833,570 A | 11/1998 | Tabata et al. |
| 5,944,630 A | 8/1999 | Omote |
| 5,991,669 A | 11/1999 | Dominke et al. |
| 6,019,698 A | 2/2000 | Lawrie et al. |
| 6,092,006 A | 7/2000 | Dominke et al. |
| 6,122,588 A | 9/2000 | Shehan et al. |
| 6,154,688 A | 11/2000 | Dominke et al. |
| 6,193,628 B1 | 2/2001 | Hrovat et al. |
| 6,263,262 B1 | 7/2001 | Bitzer et al. |
| 6,278,916 B1 | 8/2001 | Crombez |
| 6,299,563 B1 | 10/2001 | Shimasaki |
| 6,301,528 B1 | 10/2001 | Bertram et al. |
| 6,321,144 B1 | 11/2001 | Crombez |

OTHER PUBLICATIONS

Anthony M. Phillips, Functional Decomposition in a Vehicle Control System, pp. 1–6, no date.

Primary Examiner—Yonel Beaulieu
(74) Attorney, Agent, or Firm—Brooks Kushman P.C.; Carlos L. Hanze

(57) ABSTRACT

Rapidly changing torque demand is coordinated in an automotive vehicle having an engine and at least one motor. An engine base torque level indicating slowly changing torque produced by the engine is received. A motor torque is determined as a difference between a fast desired torque and the engine base torque level. An engine fast torque is determined as a difference between the request for fast desired torque and the motor torque. The motor torque is determined as a motor torque request and the engine fast torque is determined as an engine torque request.

20 Claims, 14 Drawing Sheets

VEHICLE FAST TORQUE COORDINATION

BACKGROUND OF INVENTION

1. Field of the Invention

The present invention relates to the control of torque in a vehicle. More particularly, the present invention relates to coordinating rapidly changing torque demand in an automotive vehicle with a plurality of torque producing elements.

2. Background Art

Vehicle control systems accept requests from the vehicle driver and various vehicle components as well as output from vehicle parameter sensors. Vehicle controllers use these inputs to generate control signals for vehicle equipment. Conventional control systems applied to automotive vehicle applications were used to improve engine operation in order to reduce vehicle emissions. Since these early attempts, engine controls have continued to grow in complexity as opportunities are identified to make further improvements in performance, emissions, fuel economy, and the like. Since the engine controller is still typically the most complex control system on the vehicle, it remains the primary repository for most new vehicle control algorithms as they are developed. This has resulted in two problems with conventional engine controllers.

First, several control features that reside in the engine controller are not engine specific. For example driver demand algorithms, which determine the desired traction torque or force required by the driver, are often resident in the engine controller. These algorithms are required for any vehicle, regardless of the type and number of torque generators, and are not therefore engine specific. Another example of algorithms routinely integrated into the engine controller is passive anti-theft algorithms. By not purposely distinguishing these algorithms from the base engine control algorithms, modular design, testing and implementation of the control system becomes much more difficult.

A second problem with conventional engine controllers is that many of the algorithms in the engine controller are engine system centric. Since the engine controller has historically been the predominant controller in the vehicle, many algorithms have been written assuming that the engine specific information is always available. For example, the interface between the transmission and engine control functions used for torque reduction during shifting is written in terms of spark angle rather than torque. This type of architecture is not conducive to adding other torque producing devices to the drive line such as, for example, an electric motor.

At the same time that engine control systems have been growing in complexity, control systems have been added to other subsystems on the vehicle with the intention of improving various aspects such as safety, durability, performance, emission control and the like. Typically, these control systems are implemented as stand alone systems that provide little or no interaction with the other control systems on the vehicle.

New vehicle technologies such as hybrid electric power trains, advanced engines, active suspensions, telematics, and the like are increasingly incorporated into the vehicle. As these technologies emerge and are targeted towards production vehicles, the interaction between subsystems grows ever more complex. To achieve increasingly more stringent requirements on vehicle objectives for emissions, safety, performance, and the like, the interactions between major subsystems in the vehicle need to be coordinated at the vehicle level.

Interactions between separate subsystems is particularly troublesome when coordinating rapidly changing torque requests between separate subsystem controllers. For example, the traditional engine-centric controller cannot make fast torque decisions for non-engine torque producing components.

What is needed is a functional structure that allows several torque producing devices to be coordinated at the vehicle level. This structure should be flexible, permitting application in a wide variety of vehicle configurations. In addition, this structure should be readily implemented in current and future vehicle control systems.

SUMMARY OF INVENTION

Traction requests are resolved into base requests and fast requests depending upon response times of torque devices satisfying these requests. At least one fast torque request is coordinated based on at least one base request.

One advantage of the present invention is improved control resulting from common torque request coordination. This coordination yields improved fuel economy, improved driveability and reduced emissions.

A method for coordinating rapidly changing torque demand in an automotive vehicle having an engine and at least one motor is provided. An engine base torque level indicating slowly changing torque produced by the engine is received. A request for fast desired torque is also received. A motor torque is determined as a difference between the fast desired torque and the engine base torque level. An engine fast torque is determined as a difference between the request for fast desired torque and the motor torque. A motor torque request is determined as the motor torque and an engine torque request is determined as the engine fast torque.

In an embodiment of the present invention, determining the motor torque includes limiting the difference between the fast desired torque and the engine base torque level by at least one motor torque availability limitation.

In another embodiment of the present invention, the engine torque request is determined as a base engine torque request if the base engine torque request is less than the engine fast torque.

In still another embodiment of the present invention, the motor torque is limited with at least one motor slew rate limitation prior to determining the engine fast torque.

An indicator as to the source of the request for fast desired torque may be received. Possible sources include a traction control torque request and a transmission torque modulation request.

A request for intended motor torque may be received. The motor torque request may be determined as the request for intended motor torque if the source of the request for fast desired torque does not match one of the at least one allowable fast desired torque requesters. The motor torque request may be determined as the motor torque only if the source of the request for fast desired torque matches one of at least one allowable fast desired torque requesters.

In a further embodiment of the present invention, a base engine torque request is received. The engine torque request is determined as the base engine torque request if the source of the request for fast desired torque does not match one of the at least one allowable fast desired torque requesters.

A vehicle having an engine and at least one motor is also provided. The engine supplies engine torque to drive the vehicle based on an engine torque request. Each motor supplies motor torque to drive the vehicle based on a motor torque request. The vehicle includes various torque requesting sources. Control logic receives an engine base torque level indicating slowly changing torque produced by the engine and receives a request for fast desired torque. A motor torque is determined as a difference between the fast desired torque and the engine base torque level as limited by at least one motor torque availability limitation. An engine fast torque is determined as a difference between the request for fast desired torque and the motor torque. The motor torque request is determined based on the motor torque and the engine torque request is determined based on the engine fast torque.

A method for controlling a motor vehicle having a plurality of torque producing sources for propelling the vehicle is also provided. A base torque level indicating slowly changing torque produced by a first propelling torque source is received. A second propelling source torque request is determined based on a difference between a fast desired torque and the base torque level as limited by at least one second propelling source torque availability limitation. A first propelling source torque request is determined based on a difference between the request for fast desired torque and the second propelling source torque request.

The above objects and other objects, features, and advantages of the present invention are readily apparent from the following detailed description of the preferred embodiments for carrying out the invention when taken in connection with the accompanying drawings.

DETAILED DESCRIPTION

Figure 1:
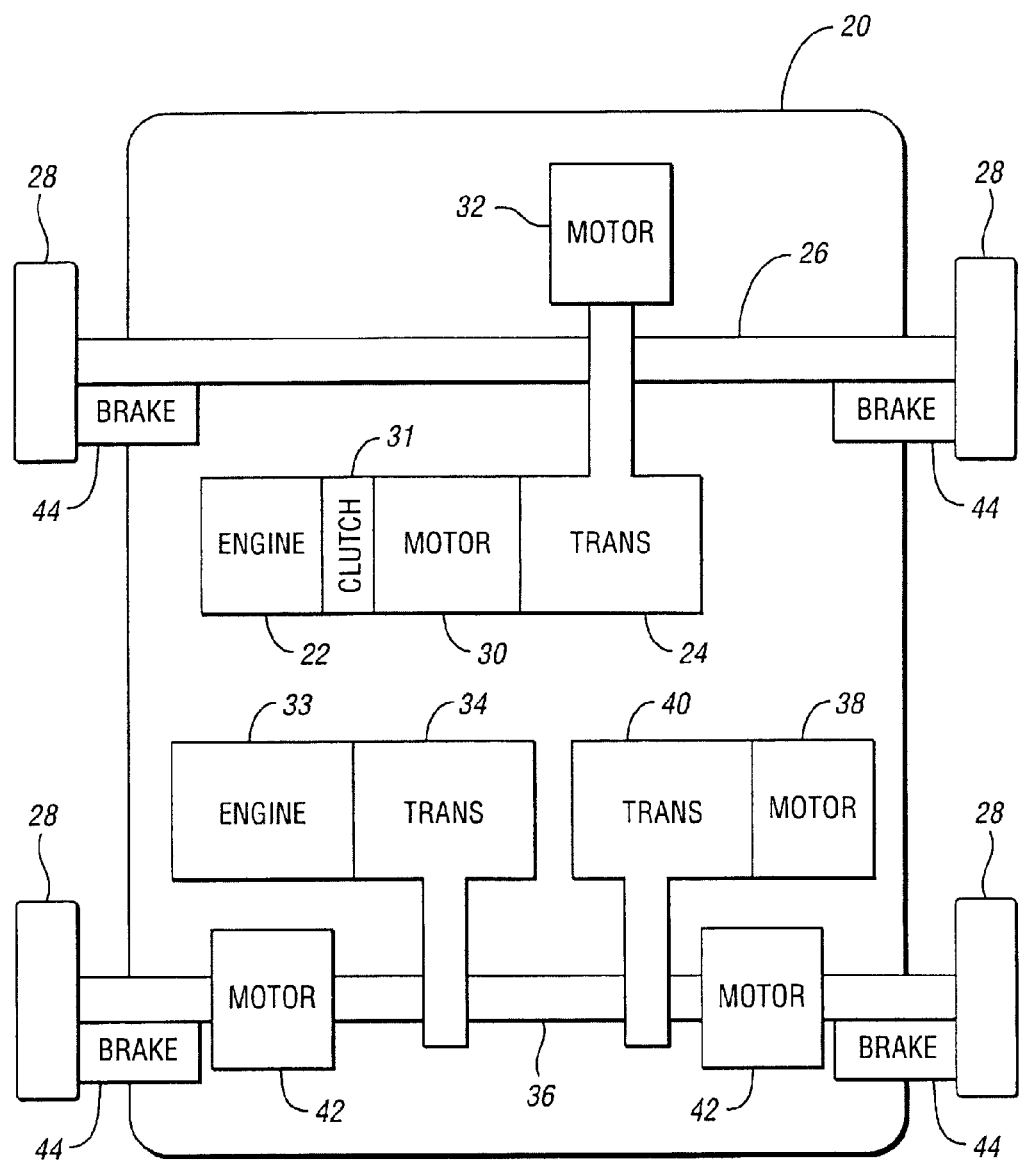
FIG. 1 is a schematic diagram illustrating torque producing devices according to an embodiment of the present invention.

Referring to FIG. 1, a schematic diagram illustrating torque producing devices according to an embodiment of the present invention is shown. Vehicle 20 may include a plurality of torque producing devices. Torque producing devices include any of a wide variety of internal combustion engines (ICE). Various types of motors may also be employed, including those powered by energy storage devices such as batteries, accumulators and the like; powered by power generating devices, such as engines, fuel cell systems, solar cell systems, and the like; or powered by any combination of these.

For example, engine 22 transmits torque through engine transmission 24 to front axle 26 thereby driving wheels 28. Engine transmission 24 is controlled to convert torque from engine 22 to axle 26 using various mechanisms such as torque converters, gears, and the like. Transmission 24 may be manual, automatic, continuously variable, composed of one or more planetary gear sets, or of any other suitable construction or operation. Vehicle 20 may also include electric motor 30 mechanically connected to engine transmission 24. Motor 30 may be, for example, an integrated starter-generator (ISG). Engine 22 may be connected to motor 30 through clutch 31. Disengaging clutch 31 allows motor 30 to drive axle 26 without driving engine 22. Various torque producing devices may be interconnected by one or more of a variety of mechanisms, including mechanical coupling, electromagnetic coupling, hydraulic coupling, and the like. Vehicle 20 may also include motor 32 connected through an intermediate stage of engine transmission 24 to axle 26.

Many alternative drive configurations are possible. For example, internal combustion engine 33 transmits torque through transmission 34 to rear axle 36 propelling wheels 28. Electric motor 38 transmits torque through separate transmission 40 to rear axle 36. Transmission 40 may also transmit torque from rear axle 36 to motor 38 when motor 38 is generating electric power. One or more motor/generators 42 may also be directly connected to axle 36. Motor/generators 42 may be electric or hydraulic, the latter storing energy in accumulators during deceleration for later delivery to wheels 28 for acceleration. Various combinations of front drive and/or rear drive sources can be implemented. In addition, any number of axles or other output shafts may be driven. The present invention is not limited to a specific configuration of drive or torque generating devices.

Vehicle 20 typically includes at least one mechanism for decelerating. Each wheel 28 may include one or more friction brake 44. Engine 22, 33 may implement compression braking. Motor 30, 32, 38, 42 may implement regenerative braking.

Vehicle 20 with a multitude of torque producing devices is more efficiently controlled through a coordinated effort to receive torque requests and generate torque commands. A multilevel consideration is appropriate since torque producing devices and torque requesting sources operate at different levels. For example, some torque producing devices operate at a transmission input level whereas other torque producing devices operate at a transmission output or wheel level. Similarly, torque requests may be received at either the transmission input or wheel levels. It should be noted that the term transmission generally refers to any means for converting torque such as gears, belts, torque converters, clutches, shafts, pulleys, and the like, as well as traditional engine transmissions.

Figure 2:
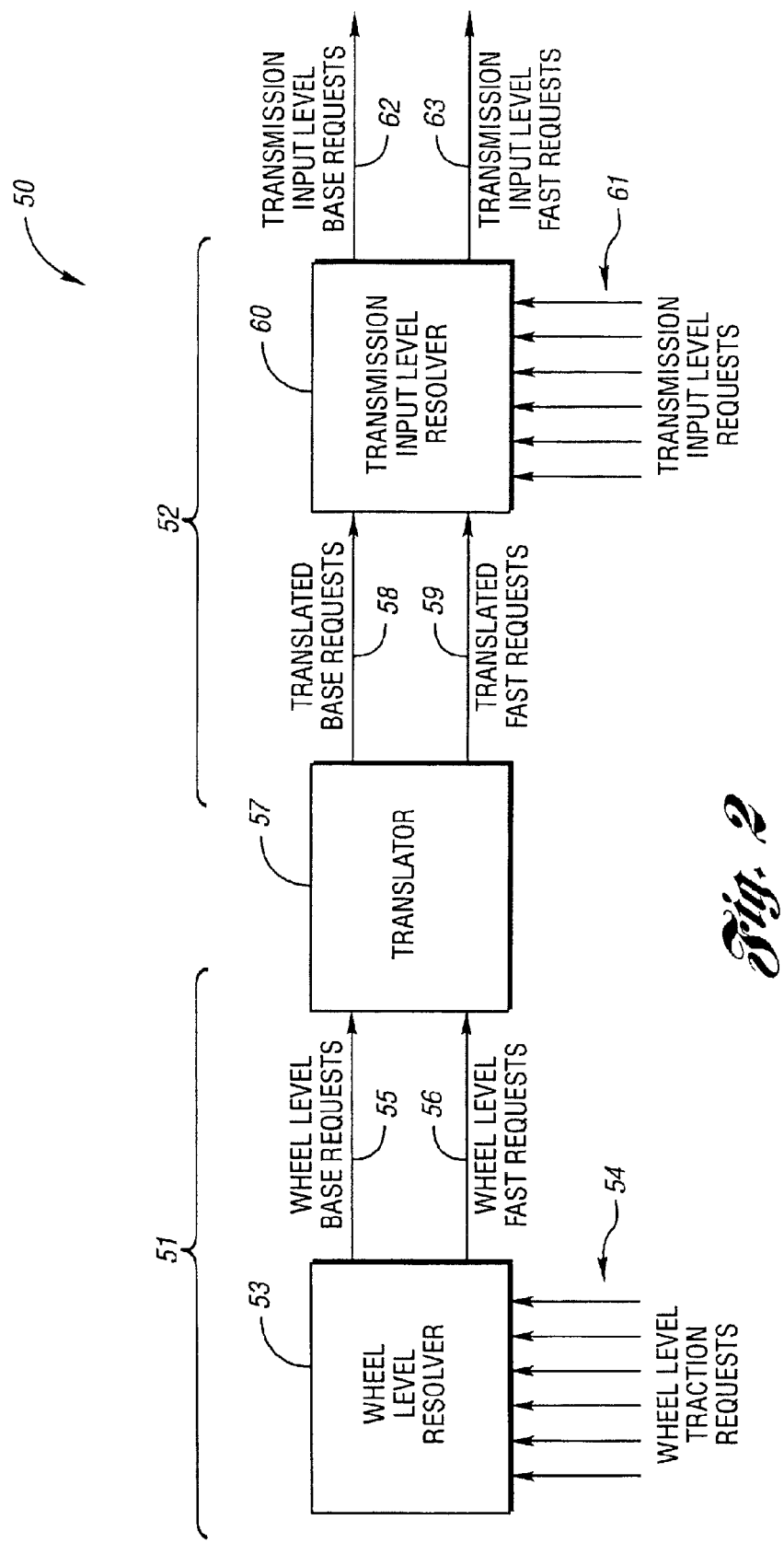
FIG. 2 is a block diagram illustrating multilevel torque resolution according to an embodiment of the present invention.

Referring now to FIG. 2, a block diagram illustrating multilevel torque resolution according to an embodiment of the present is shown. A level may be any point in a drive train where torque is requested or generated. Possible levels include at a wheel, axle, transmission input, transmission output, intermediate transmission stage, power take-off point, and the like.

An exemplary torque resolution system, shown generally by 50, operates on both wheel level 51 and transmission input level 52. Wheel level resolver 53 receives a plurality of wheel level torque requests 54 and generates at least one of wheel level base requests 55 and wheel level fast requests 56. Wheel level resolver 53 may also coordinate wheel level requests 55, 56 between wheel level torque producing devices.

Operation at wheel level 54 may be expressed in one or more of a variety of reference domains. These domains apply to both vehicle acceleration and deceleration. The wheel torque domain expresses variables in terms of the torque requested at, or delivered to, one or more wheels 28. The drive shaft domain is related to the wheel torque domain through differential gear ratios. The tractive force domain is related to the wheel torque domain through the wheel radius. The vehicle acceleration domain is related to the tractive force domain through vehicle mass. The present invention applies regardless of which domain is considered. Without loss of generality, operation at the wheel level will be described in terms of wheel torque.

Translator 57 accepts wheel level base requests 55 and wheel level fast requests 56 and translates requests 55, 56 to compensate for the effect of any torque conversion between transmission input level 52 and wheel level 51. Translator 57 generates translated base requests 58 and translated fast requests 59 by translating wheel level base requests 55 and wheel level fast requests 56, respectively.

Transmission input level resolver 60 accepts translated base requests 58, translated fast requests 59 and transmission input level requests 61. Transmission input level resolver 60 arbitrates requests 58, 59, 61 to produce transmission input level base requests 62 and transmission input level fast requests 63. Transmission input level resolver 60 may also coordinate torque requests 62, 63 between multiple transmission input level torque producing devices.

One aspect of the present invention is that torque may be arbitrated at two or more levels. For example, wheel torque and transmission input torque are arbitrated separately by torque resolution system 50. The first arbitration compares all wheel torques that are requested at wheel level 51. After drive line disturbance control, the desired value of wheel torque is translated or converted to a desired crankshaft torque by adjusting for transmission torque ratio and losses. Since this is the point in vehicle 20 at which torque is summed on the drive line, it is an appropriate place for the second arbitration to occur. Here, all requests for crankshaft (transmission input) torque, including the arbitrated and translated wheel torque, are arbitrated to determine a final desired crankshaft torque.

A second aspect of the present invention propagates arbitrated desired torque requests into two signals: a base value and a fast value. As will be recognized by one of ordinary skill in the art, there are several ways to affect the torque in vehicle 20. Thus, an effort is made to distinguish between base requested values, associated primarily with meeting driver demand and other relatively slow requests within the system, from fast values related to vehicle subsystem protection, safety, and other high speed requests for torque. This dichotomy also conveniently reflects the variation and abilities to produce torque within an engine. An internal combustion engine has methods for modifying torque that can cover the entire range of operation such as, for example, air flow modification, that typically have a low response time. These methods are best used for achieving base torque response. The internal combustion engine can also modify torque rapidly but often within only limited authority such as, for example, in spark modification. Similarly, an ISG is another device that can produce fast torque response within only limited torque capability. These types of torque production are best matched with fast torque demands.

Translator 57 may implement a fixed algorithm or a variable algorithm depending on the operation and type of transmission represented by translator 57. For example, engine transmission 24 may be represented by translator 57 implementing, for each fast and/or slow torque, the following formula: $\tau_c = rFm + y$, where $\tau_c$ is a transmission input torque as represented by translated wheel level base requests 58 or translated wheel level fast requests 59, r is an effective wheel rolling radius, F is a traction force representing wheel level base requests 55 or wheel level fast requests 56, m is a torque ratio, and y is a torque offset. In addition, while only one translator 57 is shown in FIG. 2, a plurality of translators 64 may be used if multiple transmissions convert torque within vehicle 20. Examples of other levels between which translation may occur include differential input, planetary gear stages, and the like.

Figure 3A:
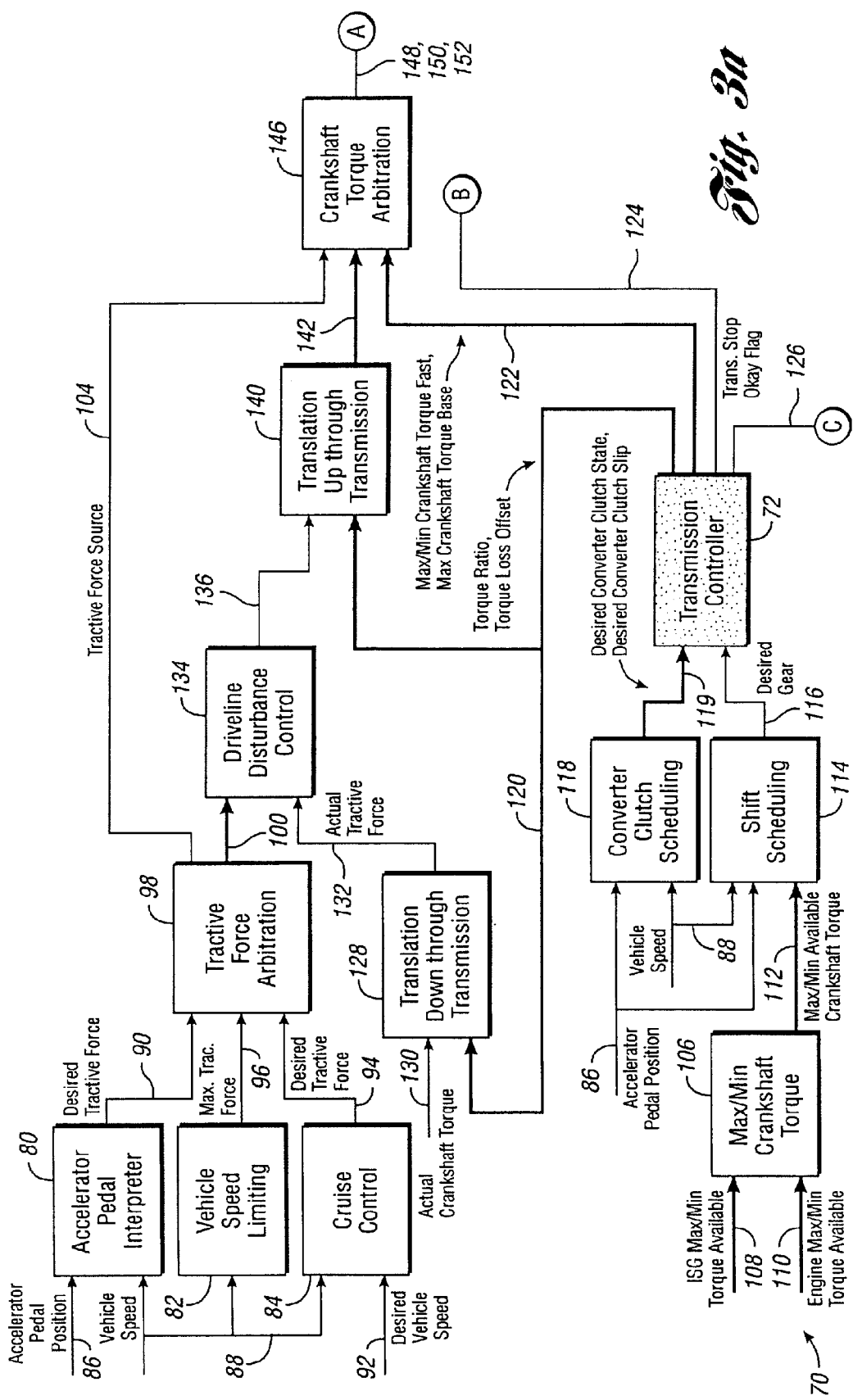
FIGS. 3a and 3b are a block diagram illustrating motion control functions for an integrated starter-generator hybrid vehicle according to an embodiment of the present invention.
Figure 3B:
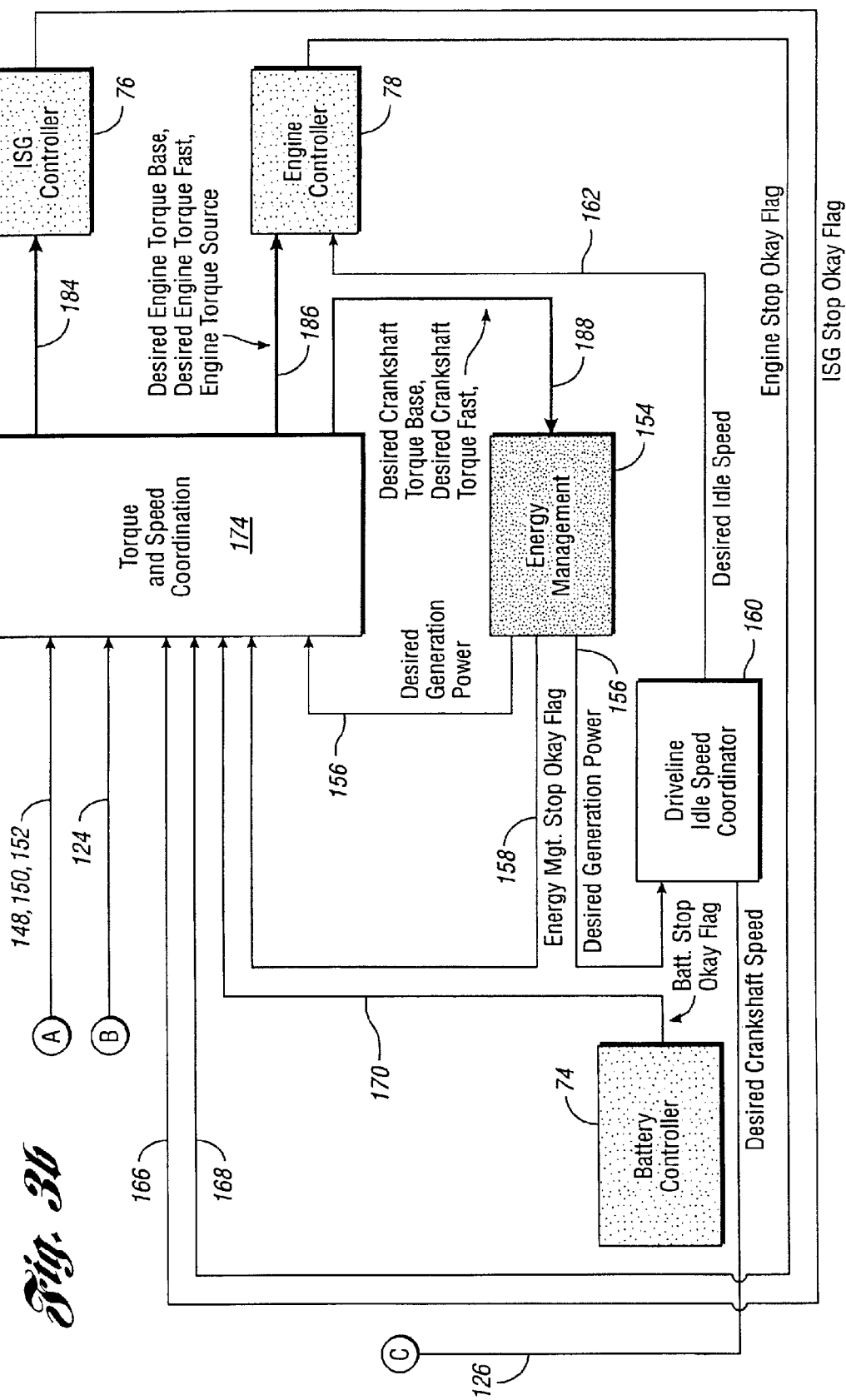

Referring now to FIGS. 3a and 3b, a block diagram illustrating motion control functions for an integrated starter-generator (ISG) hybrid vehicle according to an embodiment of the present invention is shown. A vehicle system controller, shown generally by 70, contains the set of distinguishing characteristics for torque control in vehicle 20. Vehicle system controller 70 also coordinates the interactions of various subsystems in vehicle 20 as represented by transmission controller 72, battery controller 74, ISG controller 76, and engine controller 78. Vehicle system controller 70 is preferably implemented on a microcontroller system within vehicle 20. As will be recognized by one of ordinary skill in the art, functions performed by vehicle system controller 70 may be implemented in more than one special purpose controller, may be split amongst other vehicle controllers, and may implement functionality that may otherwise be assigned to various other vehicle controllers. Functionality in vehicle system controller 70 may be implemented as hardware, software, firmware, or any combination.

Vehicle system controller 70 may be divided into a plurality of functional elements, as illustrated here by way of example. Accelerator pedal interpreter 80, vehicle speed limiting 82, and cruise control 84 generate wheel level torque requests. Accelerator pedal interpreter 80 accepts accelerator pedal position 86 and vehicle speed 88 and determines driver's desired tractive force 90. Cruise control 84 accepts desired vehicle speed 92 and vehicle speed 88 and determines cruise desired tractive force 94 needed to maintain a desired vehicle speed. Vehicle speed limiting 82 determines maximum tractive force 96 as a limit needed to avoid vehicle overspeed condition. Tractive force arbitration 98 accepts desired tractive forces 90, 94 and maximum tractive force 96. Tractive force arbitration 98 arbitrates requests for tractive force from these various sources and generates desired tractive force base. Desired tractive force base 100 is a wheel level base request.

Tractive force arbitration 98 also generates tractive force source 104 propagated along with base desired tractive force 100. Tractive force source 104 provides an indication of the requirements of the torque command and is used to help the torque and speed coordination function and torque producing subsystems to determine the appropriate method for achieving the desired torque values. For example, engine 22 can produce a fast torque reduction by either modifying spark advance or fuel cutoff to cylinders. The utility of these two methods varies, however, as spark is limited in the range of reduction that can be achieved whereas fuel is limited in the precision of the torque reduction produced. By encoding either the source of the torque request or the desired affect of the request in tractive force signal 104, torque and speed coordination function and torque producing subsystems can make better decisions as to the appropriate course of action.

Max/min crankshaft torque 106 determines total minimum and maximum available crankshaft torque from all sources. In this example, inputs include ISG max/min torque available 108 from ISG controller 76 and engine max/min torque available 110 from engine controller 78. Max/min crankshaft torque 106 generates max/min available crankshaft torque 112. Shift scheduling 114 accepts accelerator pedal position 86, vehicle speed 88, and max/min available crankshaft torque 112. Shift scheduling 114 determines transmission configuration as desired gear signal 116 to transmission controller 72. Converter clutch scheduling 118 determines the desired lock up status of the torque converter bypass clutch based on accelerator pedal position 86 and vehicle speed 88. Specifically, converter clutch scheduling 118 generates desired converter clutch state and desired converter clutch slip 119 for transmission controller 72. Transmission controller 72 controls clutch and valve solenoids within engine transmission 24. Transmission controller 72 also generates a variety of signals including torque ratio and torque loss offset signals, shown generally by 120, used for translating torque requests. Signal 122 from transmission controller 72 indicates the maximum and minimum crankshaft fast torque and maximum crankshaft base torque. Signal 124 indicates transmission stop permission and signal 126 indicates desired crankshaft speed.

Block 128 performs translation down through engine transmission 24. Actual crankshaft torque 130 is translated using torque ratio and torque loss offset signals 120 to produce actual tractive force 132. Driveline disturbance control 134 accepts desired tractive force base 100 and actual tractive force 132 to smooth driveline responses to rapid changes in torque demand. The result is filtered desired tractive force base 136.

Block 140 translates desired tractive force to desired crankshaft torque. Filtered desired tractive base force 136 is translated using torque ratio and torque loss offset signals 120 to produce translated desired tractive force base 142.

Crankshaft torque arbitration 146 accepts translated desired tractive force base 142 and tractive force source 104 as well as requests of crankshaft torque from any other source. Crankshaft torque arbitration 146 arbitrates these requests to generate desired crankshaft torque base 148, desired crankshaft torque fast 150, and crankshaft torque source 152 reflecting tractive force source 104.

Referring now to FIG. 3b, energy management block 154 represents energy management functions of vehicle system controller 70. Energy management 154 generates desired generation power 156 and energy management stop okay flag 158. Driveline idle speed coordination 160 accepts desired generation power 156 and desired crankshaft speed 126 to determine the desired operating speed for driveline during periods without driver demand. This desired operating speed is expressed as desired idle speed 162 used by engine controller 78.

Torque and speed coordination function 174 splits requested torque between various torque producers. In this example, torque producers are internal combustion engine 22 and ISG motor 30 as controlled by engine controller 78 and ISG controller 76, respectively. Torque and speed coordination 174 accepts desired crankshaft torque base 148, desired crankshaft torque fast 150, and crankshaft torque source 152 from crankshaft torque arbitration 146. Inputs also include transmission stop okay flag 124, energy management stop okay flag 158, ISG stop okay flag 166 from ISG controller 76, engine stop okay flag 168 from engine controller 78, battery stop okay flag 170 from battery controller 74, and desired generation power 156. ISG controller 76 receives desired ISG torque, desired ISG speed, and ISG torque or speed control mode, represented by signals 184, from torque and speed coordination 174. Engine controller 78 receives desired engine torque base, desired engine torque fast, and engine torque source, represented by signals 186, from torque and speed coordination 174. Energy management 154 receives desired crankshaft torque base and desired crankshaft torque fast, represented by signals 188, from torque and speed coordination 174.

Figure 4A:
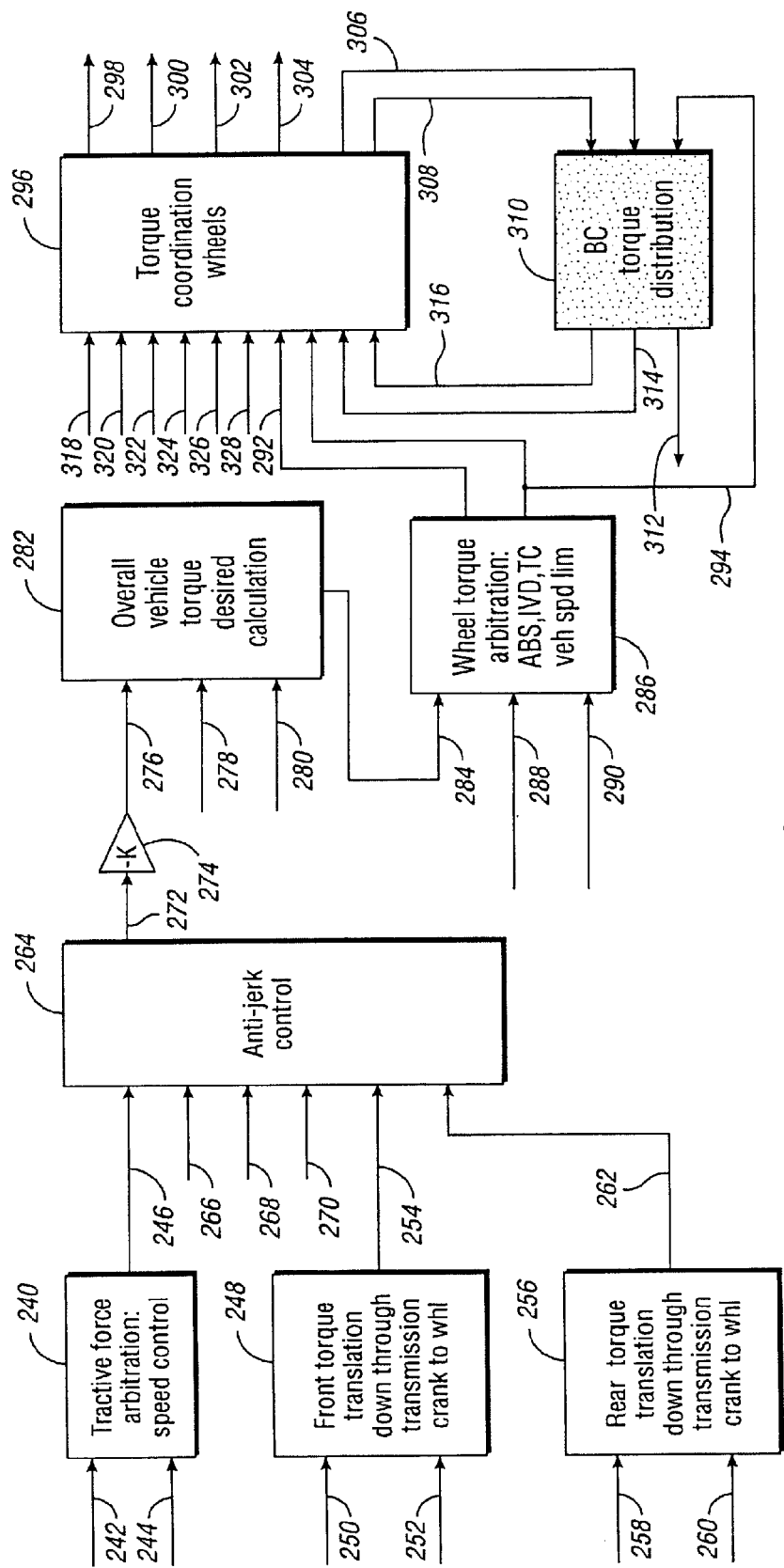
FIGS. 4a–4c are block diagrams illustrating a generalized architecture for vehicle motion control according to an embodiment of the present invention.
Figure 4B:
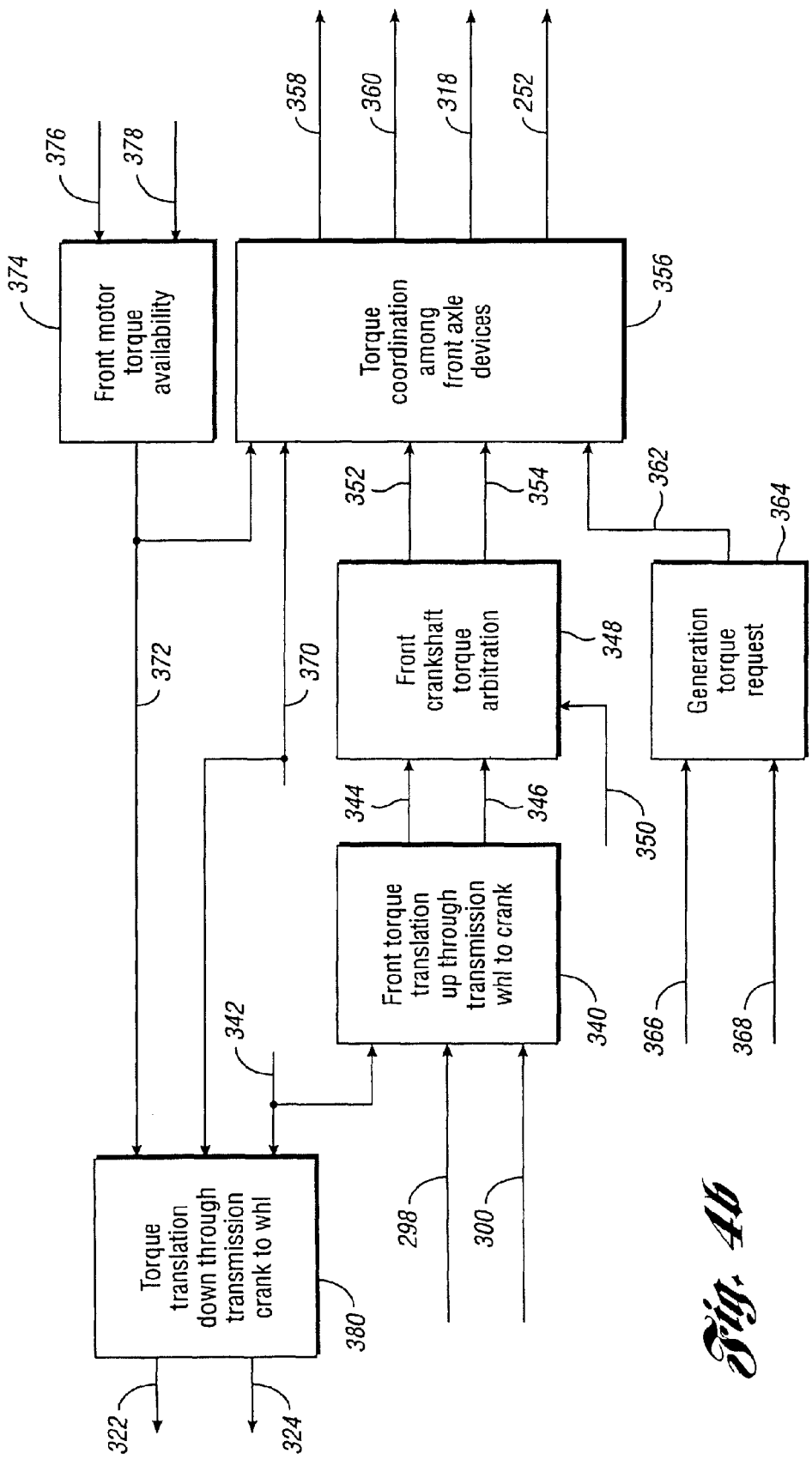
Figure 4C:
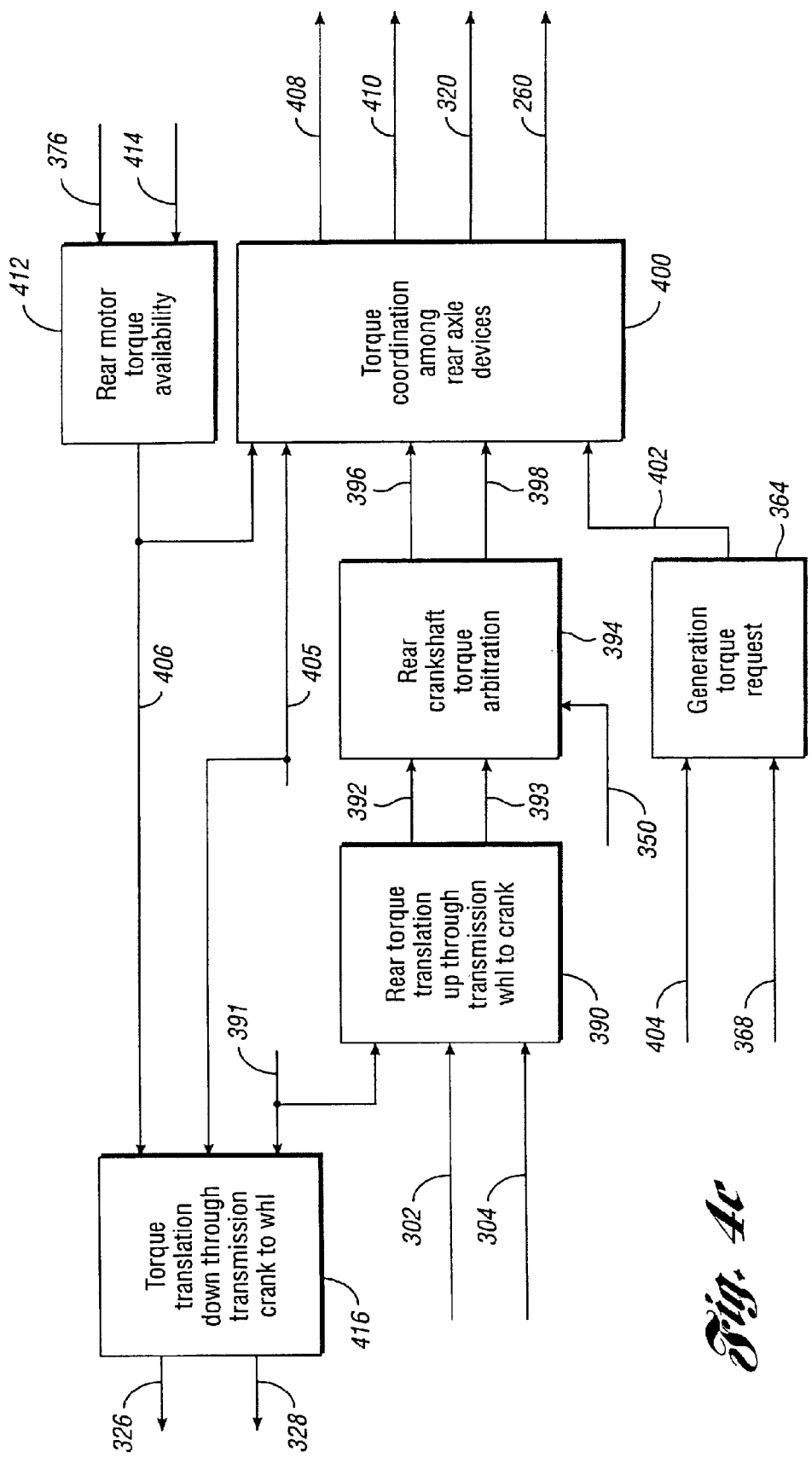

Referring now to FIGS. 4a–4c, block diagrams illustrating a generalized architecture for vehicle motion control according to an embodiment of the present invention are shown. In certain applications, there is a need to coordinate torque requests at the wheels. Examples of such applications include when electro-hydraulic brakes (EHB) are used to more efficiently capture braking energy, when a traction motor is introduced on an axle not driven by an internal combustion engine to provide four-wheel drive functionality, and the like. A generalized architecture covers the case where some propelling devices apply torque to the crankshaft/output shaft, with this torque passed through one or more typically variable transmissions before reaching the wheels, and other devices apply torque directly coupled to the wheels. An example of such an architecture is an electric four-wheel drive system with one or more electrical motors applying power directly to an axle or wheel.

Referring now to FIG. 4a, wheel level torque resolution is illustrated. Speed control arbitration function 240 accepts accelerator desired wheel force 242 from driver evaluator and wheel force limit signals 244 from vehicle speed control and produces desired wheel force 246. Front torque translation 248 uses front transmission parameters 250 to convert front crankshaft torque 252 to front tractive force 254. Rear torque translation 256 uses rear transmission parameters 258 to convert rear crankshaft torque 260 to rear tractive force 262.

Anti-jerk control 264 filters desired wheel force 246, front tractive force 254, rear tractive force 262, and other slowly changing tractive requests such as driver evaluator signals 266, engine controller signals 268, transmission controller signals 270, and the like. Anti-jerk control 264 generates base tractive force requests 272 which are multiplied by one or more wheel constants 274 to produce acceleration torque requests 276. Acceleration torque requests 276, braking torque requests 278 from a braking controller, and vehicle speed signal 280 are combined in calculation block 282 to produce overall vehicle desired torque signal 284. Wheel torque arbiter 286 accepts overall vehicle desired torque signal 284 together with fast acting torque requests 288 from the brake controller. Fast brake signals 288 are generated by components including anti-lock brake systems (ABS), stability and traction control (STC), interactive vehicle dynamics (IVD), and the like. Torque vehicle speed limit 290 provides allowable torque limits. Wheel torque arbiter 286 generates wheel level base requests 292 and wheel level fast requests 294.

Signals along the interface among functions can be either scalars or vectors. For example, fast brake signals 288 can be expressed individually for each wheel or for each axle. The respective signals can then be propagated as vectors and considered individually for torque coordination.

Wheel torque coordinator 296 distributes torque requests between front torque request base 298, front torque request fast 300, rear torque request base 302 and rear torque request fast 304. Front brake torque intent 306 and rear brake torque intent 308 are nonzero only during braking. Braking controlled torque distribution 310 accepts front brake torque intent 306, rear brake torque intent 308, wheel level fast requests 294 and internal brake subsystem controller signals and generates brake torque requests 312 for the brake controller, as well as front axle torque limits 314 and rear axle torque limits 316. Wheel torque coordinator 296 accepts as input various torque requests including wheel level base requests 292, wheel level fast requests 294, front generator torque requests at the wheel level 318, and rear generator torque requests at the wheel level 320. Wheel torque coordinator 296 also accepts torque limits including front axle torque limit 314, rear axle torque limit 316, front motor torque availability limit 322, front engine torque availability limit 324, rear motor torque availability limit 326, and rear engine torque availability limit 328. Not all of these signals will be present in every application.

Referring now to FIG. 4b, front crankshaft input level torque resolution is illustrated. Front torque translator 340 uses front transmission parameters 342 such as gear ratios, torque ratios, transmission internal losses and the like, to translate front torque request base 298 and front torque request fast 300 to translated wheel level front torque request base 344 and translated wheel level front torque request fast 346, respectively. Front crankshaft torque arbitration 348 arbitrates translated wheel level front torque request base 344 and fast 346 with limits such as torque limit during shift 350 from front transmission controller resulting in transmission input level front torque request base 352 and fast 354, respectively.

Front axle torque coordinator 356 distributes torque requests among front axle torque producing devices. To this end, front axle torque coordinator 356 generates base and fast engine torque requests 358 for a front engine controller and motor torque requests 360 for a front motor. In addition front axle torque coordinator 356 generates front generator torque request at the wheel level 318 and actual front crankshaft torque 252. Front axle torque coordinator accepts requests such as transmission input level front torque request base 352 and fast 354 and electrical power generation torque request 362 from generation torque requester 364 based on energy management front generated power request 366 and engine speed idle target 368 from front engine controller. Front axle torque coordinator 356 distributes torque requests based on availabilities and capabilities of torque producing devices as represented, for example, by engine torque capability signal 370 and front motor torque availability signal 372.

Front motor torque availability signal 372 is generated by motor availability logic 374 based on state of charge signal 376 from an energy storage management module and torque capacity signal 378 from a front motor control. Engine torque capability signal 370 and front motor torque availability signal 372 are translated by front down torque translator 380 based on front transmission parameters 342 to generate front engine torque availability limit 324 and front motor torque availability limit 322, respectively.

Referring now to FIG. 4c, rear transmission level torque resolution is illustrated. In the general case, rear transmission level torque resolution operates fundamentally the same as front transmission level torque resolution. Rear torque translator 390 uses rear transmission parameters 391 such as gear ratios, torque ratios, transmission internal losses and the like, to translate rear torque request base 302 and rear torque request fast 304 to translated wheel level rear torque request base 392 and translated wheel level rear torque request fast 393, respectively. Rear crankshaft torque arbitration 394 arbitrates translated wheel level rear torque request base 392 and fast 393 with limits such as torque limit during shift 350 from rear transmission controller resulting in transmission input level rear torque request base 396 and fast 398, respectively.

Rear axle torque coordinator 400 accepts rear transmission input level torque request base 396 and fast 398, rear electrical power generation torque request 402 based on rear generated power request 404, as well as engine torque capability signal 405 and rear motor torque availability signal 406. Rear axle torque coordinator 400 generates base and fast engine requests 408, motor torque requests 410, rear generator torque requests at the wheel level 320, and rear crankshaft torque signals 260. Rear motor torque availability signal 406 is generated by motor availability logic 412 based on torque capacity signal 414 from rear electric motor controller. Rear down torque translator 416 translates rear motor torque availability signal 406 and engine torque capability signal 405 into rear motor torque availability limit 326 and rear engine torque availability limit 328.

Figure 5:
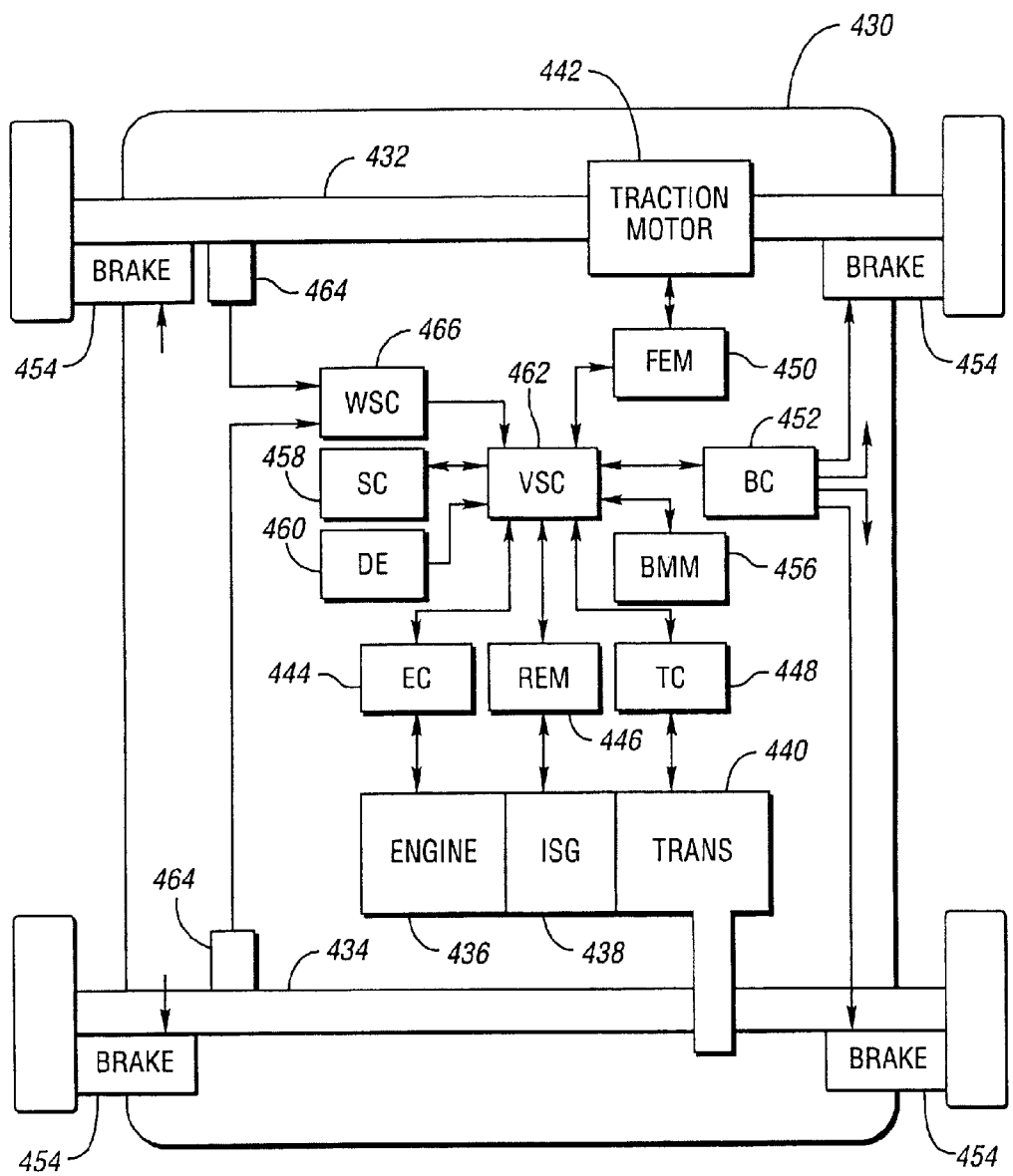
FIG. 5 is a schematic diagram illustrating a vehicle with electric four-wheel drive according to an embodiment of the present invention.

Referring now to FIG. 5, a schematic diagram illustrating a vehicle with electric four-wheel drive according to an embodiment of the present invention is shown. Vehicle 430 includes front axle 432 and rear axle 434. Internal combustion engine 436 and integrated starter-generator (ISG) 438 are coupled to rear axle 434 through automatic engine transmission 440. Traction motor 442 is either directly coupled to front axle 432 or coupled to front axle 432 through a fixed transmission, the effects of which may be ignored without loss of generality.

Torque control within vehicle 430 is distributed amongst a plurality of modules. Engine controller (EC) 444 controls various engine functions including spark, air, fuel, cam timing, exhaust gas recirculation control, and the like. Engine controller 444 provides indications of the maximum and minimum engine torque available. Rear electric motor controller (REM) 446 provides control signals to ISG 438. Transmission controller (TC) 448 provides clutch and valve solenoid control for transmission 440. Front electric motor control (FEM) 450 provides control signals to traction motor 442. Brake control 452 handles braking functions such as actuation for hydraulic brakes 454, anti-lock brake control, and the like. Battery management module (BMM) 456 provides state of charge and state of health estimation and current and voltage limit calculations, as well as actual voltage and current measurements. Vehicle speed control (SC) 458 provides cruise control and maximum allowed vehicle speed-based torque limits. Driver evaluator (DE)

460 provides signals based on driver input. Vehicle system controller (VSC) 462 provides top level torque resolution for vehicle 430. Sensors 464 on axles 432, 434 provide axle rotation information to wheel slip controller 466 for balancing wheel speeds. As will be recognized by one of ordinary skill in the art, one or more of the modules illustrated may be implemented with the same hardware. Further, functions attributed to each module may be divided amongst various hardware components.

Figure 6A:
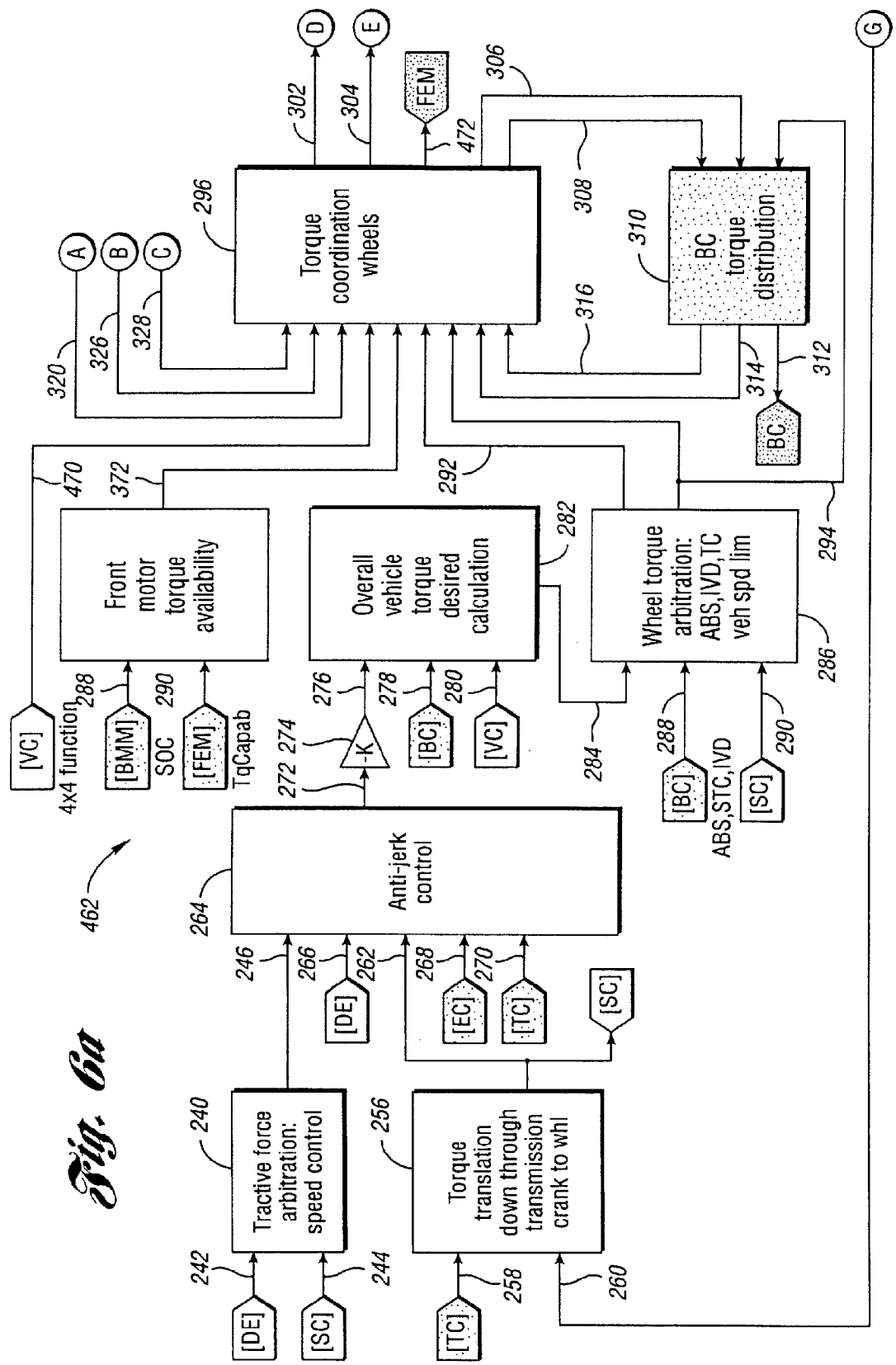
FIGS. 6a and 6b is a block diagram illustrating a vehicle motion controller for electric four-wheel drive according to an embodiment of the present invention.
Figure 6B:
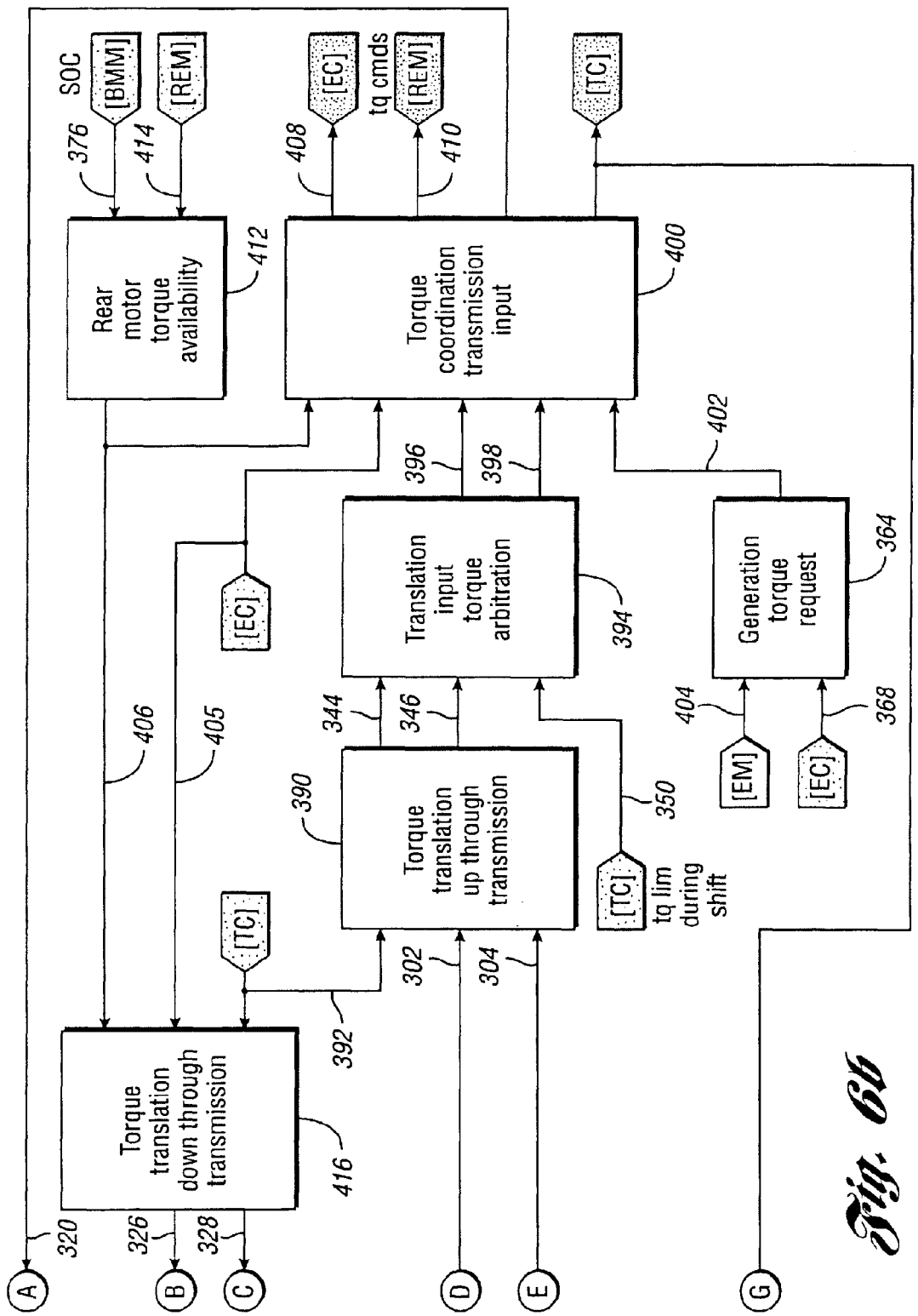

Referring now to FIGS. 6a and 6b, a block diagram illustrating a vehicle motion controller for electric four-wheel drive according to an embodiment of the present invention is shown. Vehicle system controller 462 implements logic to arbitrate between torque requests and coordinate request distribution amongst torque producing devices. The logic illustrated in FIG. 6 is similar to the generalized logic illustrated in FIGS. 4a–4c.

Various wheel level torque requests are filtered, combined, limited, and otherwise arbitrated to produce wheel level base requests 292 and wheel level fast requests 294. Additional inputs include four-by-four request interpreter signal 470 for balancing axle or wheel speeds. Wheel torque coordinator 296 generates rear torque request base 302 and rear torque request fast 304 which are translated by rear torque translator 390. No such translation may be required for traction motor 442 driving front axle 432. If translation is required, the translation is fixed. Thus, wheel torque coordinator 296 generates wheel level torque request signal 472 for front electric motor controller 450.

Figure 7:
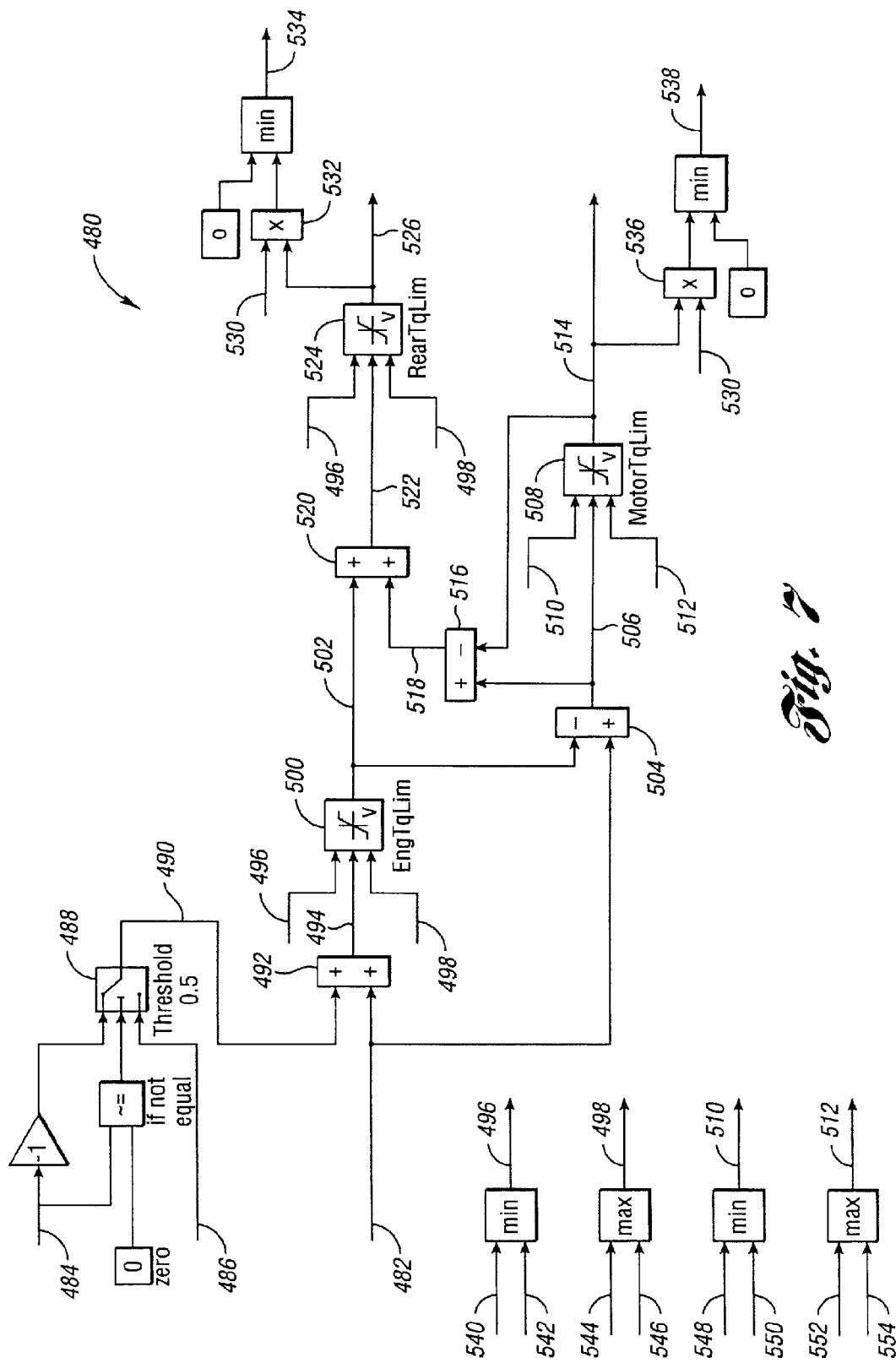
FIG. 7 is a block diagram illustrating wheel level torque coordination according to an embodiment of the present invention.

Referring now to FIG. 7, a block diagram illustrating wheel level torque coordination according to an embodiment of the present invention is shown. In most hybrid configurations, there is a need for torque coordination function at wheel or axle level 52. Inputs to such a coordination function include arbitrated at wheel level torque requests for the vehicle as a whole, torque requests for individual axles, torque requests for individual wheels, driver demand information, and limitations from various sources such as vehicle stability, and the like. In addition, inputs should include torque capabilities and limitations of devices applying torque to the wheels either directly or translated through a transmission. The coordination function prioritizes torque application sources based on driver requirements, efficiency considerations, performance considerations, and the like. Torque coordination effectively funnels torque requests through torque availability limits in a priority order. This results in the issuance of torque commands to torque producing devices within the capability of these devices.

The embodiment illustrated in FIG. 7 implements torque coordination at the wheel level for an electric four wheel drive vehicle as depicted schematically in FIG. 5. Electric motor 442 drives front axle 432 and internal combustion engine 436 provides torque through transmission 440 to rear axle 434.

A wheel level torque coordinator, shown generally by 480, accepts arbitrated torque request 482. Wheel level torque coordinator 480 may accept additional torque requests as well. In the embodiment shown, requests include 4×4 torque request 484 for regulating axle speeds and generator torque request 486 from energy management controller 154. Selector 488 passes inverted 4×4 torque request 484 as auxiliary torque request 490 if 4×4 torque request 484 is non-zero. Otherwise, selector 488 passes generator torque request 486 as auxiliary torque request 490. Auxiliary torque request 490 is added to arbitrated torque request 482 in summer 492 to produce summed torque request 494.

Since auxiliary torque request 490 is either the negative of 4×4 torque request 484 or generator torque request 486, which can be a negative requested torque, summed torque request 494 may be less than arbitrated torque request 482.

Engine maximum torque limit 496 and engine minimum torque limit 498 provide inputs to engine torque limiter 500. Engine torque limiter 500 outputs initial coordinated torque request 502 as summed torque request 494 limited by engine maximum torque limit 496 and engine minimum torque limit 498. Differencer 504 subtracts initial coordinated torque request 502 from arbitrated torque request 482 to produce first excess requested torque 506. First excess requested torque 506 represents requested torque in excess of the capability of engine 436.

Motor torque limiter 508 accepts motor maximum torque limit 510 and motor minimum torque limit 512 representing torque limits for electric motor 442. Motor torque limiter 508 outputs front axle torque request 514 as first excess requested torque 506 limited by motor maximum torque limit 510 and motor minimum torque limit 512. Differencer 516 subtracts front axle torque request 514 from first excess requested torque 506 to produce second excess requested torque 518. Second excess requested torque 518 indicates requested torque which cannot be handled by electric motor 442.

Summer 520 adds initial coordinated torque request 502 and second excess requested torque 518 to produce coordinated torque request 522. Rear torque limiter 524 generates rear axle torque request 526 by limiting coordinated torque request 522 with engine maximum torque limit 496 and engine minimum torque limit 498.

Wheel level torque coordinator 480 may be used to implement a wide variety of torque coordinating functions. For example, power assist is provided whenever powertrain wheel torque requests, as represented by arbitrated torque request 482, exceed the torque availability estimated for engine 436 at the wheels. The excess request will be directed to traction motor 442 through front axle torque request 514.

Another function is 4×4 balancing. 4×4 torque request 484 represents the need to regulate to zero the difference in speeds between front axle 432 and rear axle 434. In this situation, arbitrated torque request 482 is subtracted from the engine torque request and added to the motor torque request. Effectively, the request for engine torque is reduced by 4×4 torque request 484 and the request to front axle traction motor 442 is increased by 4×4 torque request 484. This redistributes torque between the axles for better vehicle traction without the need for driver intervention.

Another function is charging through the road. In the absence of a 4×4 request and in the event of a low state of charge on the high voltage battery, traction motor 442 can be used to charge the battery. This is accomplished by increasing the torque request to engine 436 and subtracting this increase from the torque requested to traction motor 442. This effectively requests motor 442 to apply negative torque. This negative torque converts traction motor 442 into a generator for charging the battery.

Yet another function is regenerative braking. During a braking maneuver, powertrain wheel torque request 482 will have a negative sign. After subtracting the effect of engine compression braking at the wheels, if any, the remainder of the powertrain request is sent to electric motor 442. Electric motor 442 applies negative torque within its torque availability and within the state of battery charge. Remaining braking torque may be provided by foundation brakes.

Still another function is bleed through the road. In the event of a very high battery state of charge, battery energy may be depleted to create room for future regenerative events by using motive torque from motor 442 in parallel with engine 436. The energy management function sends a negative torque request as generator torque request 486. This negative request effectively reduces the torque command to engine 436 and increases the torque command to motor 442, thus using excess battery energy Wheel level torque coordinator 480 may be used to calculate powertrain braking torque requests. Rear axle torque request 526 is multiplied by vehicle rolling direction 530 in multiplier 532. Vehicle rolling direction 530 has a value of 1.0 if vehicle 430 is traveling in a forward direction and a value of −1.0 if vehicle 430 is traveling in a reverse direction. Rear powertrain brake torque request 534 is the output of multiplier 532 if this output is less than zero and is zero otherwise. Similarly, front axle torque request 514 is multiplied by vehicle rolling direction 530 in multiplier 536. Front powertrain brake torque request 538 is the output of multiplier 536 if this output is less than zero and is zero otherwise.

Torque limits within wheel level torque coordinator 480 may each be based on one or more torque limitation inputs. In the embodiment shown, engine maximum torque limit 496 is the minimum of wheel level maximum engine torque capability 540 and rear axle maximum torque 542. Engine minimum torque limit 498 is the maximum of wheel level minimum engine torque capability 544 and rear axle minimum torque 546. Motor maximum torque limit 510 is the minimum of wheel level maximum motor torque capability 548 and front axle maximum torque 550. Motor minimum torque limit 512 is the maximum of wheel level minimum motor torque capability 552 and front axle minimum torque 554.

Figure 8:
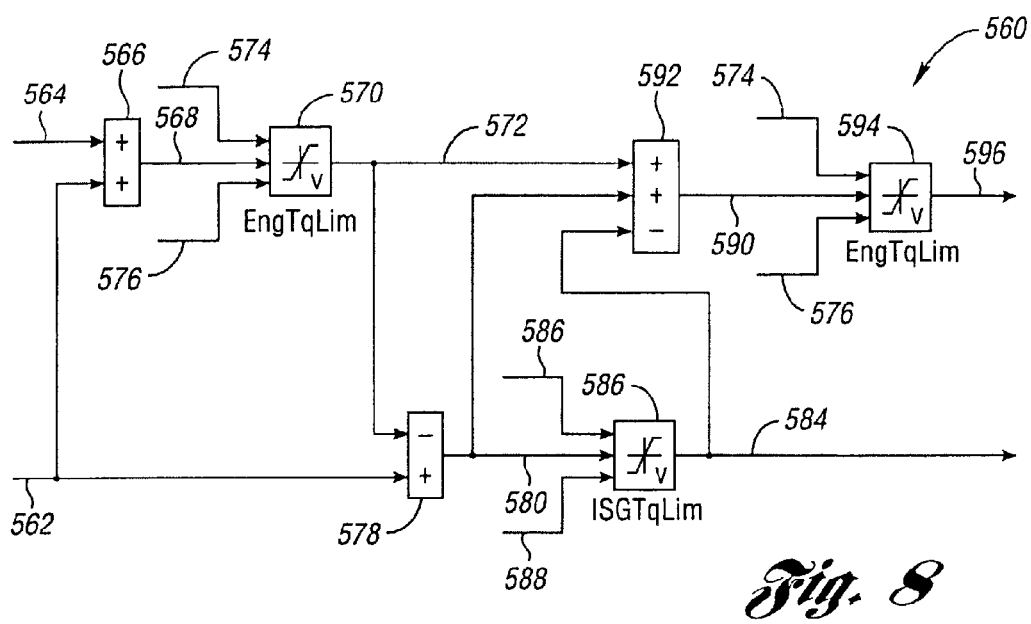
FIG. 8 is a block diagram illustrating transmission input level base torque coordination according to an embodiment of the present invention.

Referring now to FIG. 8, a block diagram illustrating transmission input level base torque coordination according to an embodiment of the present invention is shown. A transmission input level torque coordinator, shown generally by 560, accepts crankshaft desired base torque 562 and generator requested torque 564. Crankshaft desired base torque 562 and generator requested torque 564 are added in summer 566 to produce combined requested torque 568. Limiter 570 produces initial coordinated torque request 572 by limiting combined requested torque 568 with engine maximum torque limit 574 and engine minimum torque limit 576.

Initial coordinated torque request 572 is subtracted from crankshaft desired base torque 562 by differencer 578 to produce first excess requested torque 580. Limiter 582 generates coordinated motor request 584 by limiting first excess requested torque 580 with motor maximum torque limit 586 and motor minimum torque limit 588. Coordinated torque request 590 is generated in summer 592 by subtracting coordinated motor request 584 from the sum of initial coordinated torque request 572 and first excess requested torque 580. Limiter 594 generates coordinated engine base request 596 by limiting coordinated torque request 590 with engine maximum torque limit 574 and engine minimum torque limit 576.

Torque coordination may also include a variety of functions such as power assist, regenerative braking, charging, bleed, and the like.

Figure 9:
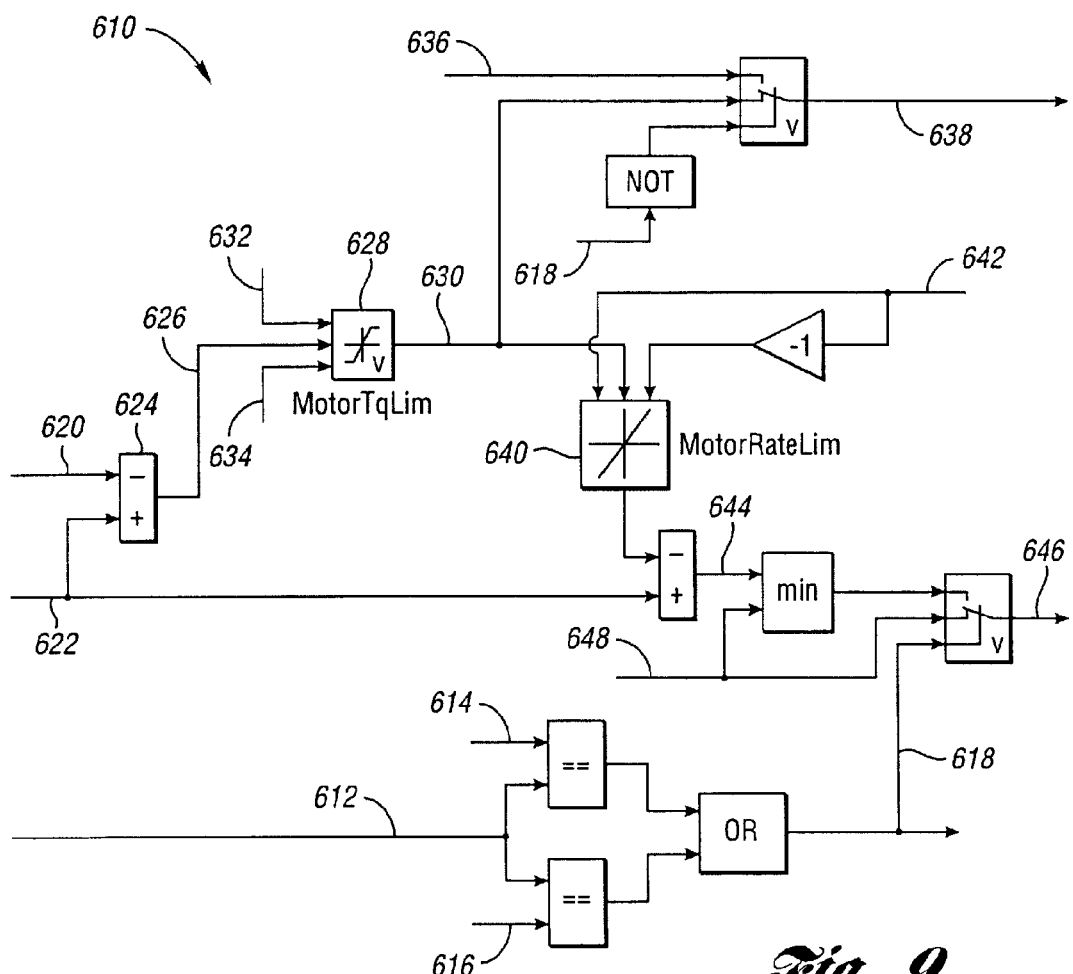
FIG. 9 is a block diagram illustrating fast torque coordination at the transmission input level according to an embodiment of the present invention.

Referring now to FIG. 9, a block diagram illustrating fast torque coordination at the transmission input level according to an embodiment of the present invention is shown. In this embodiment, fast torque coordination is selected only for certain types of fast requests. A fast torque coordinator, shown generally by 610, receives arbitration winner 612 from one or both of wheel level arbitration and transmission input level arbitration. If arbitration winner 612 equals either traction control torque request 614 or transmission torque modulation request 616, then binary match flag 618 is set. As will be described in greater detail below, binary match flag 618 is a control signal selecting outputs for fast torque coordinator 610.

Actual engine base torque 620 is subtracted from desired fast torque 622 in differencer 624 to produce initial fast torque request 626. Limiter 628 generates limited fast torque request 630 by limiting initial fast torque request 626 with maximum available motor torque 632 and minimum available motor torque 634. If binary match flag 618 is not asserted, base intended motor torque 636 is output as motor torque request 638. If binary match flag 618 is asserted, limited fast torque request 630 is output as motor torque request 638.

Limiter 640 uses motor slew rate 642 to represent the dynamic response of the electric motor for estimating transient motor torque output. This value is subtracted from desired fast torque 622 to produce desired engine fast torque 644. If binary match flag 618 is asserted, engine torque request 646 is the minimum of desired engine fast torque 644 and engine requested base torque 648. If binary match flag 618 is not asserted, engine torque request 646 is simply engine requested base torque 648.

Conventional, non-hybrid vehicles with automatic or automated shift manual transmissions have a large degree of interaction between the engine and transmission control systems. One of these interactions is torque modification requested of the engine by the transmission controller prior to and during a shift event. This modulation, typically a torque reduction, improves the quality or feel of the shift and protects the internal transmission components.

Typically, the engine controller has several options to achieve the requested torque modulation. Spark timing modification has generally been preferred over air or fuel modulation for a number of reasons. Although air modulation has the benefit of a wide range of authority with respect to torque command, the response time of the engine due to changes in air command are too slow to effectively modify the torque in the time required for the shift. Torque changes due to spark timing modification, on the other hand, are nearly instantaneous due to the direct impact of spark on combustion. Spark control is also preferable to fuel cut out due to the granularity of control associated with the fuel command. This is particularly true for individual cylinder fuel injection where the amount of fuel injected must be kept in proportion to the amount of air in the cylinder. Thus, torque can only be reduced by cutting out individual cylinders completely. This results in limited, discrete levels of torque production that are not sufficient to adequately control torque during shifting. Spark control has the advantage that continuous change in spark angle results in continuous change in the torque produced by the engine.

The use of spark angle modification for torque modulation does, however, have several disadvantages. First, the range of torque authority from spark control is limited to only about 30% of the current level of torque being produced. This directly limits the level of reduction that the transmission can request during a shift. Also, since the spark angle is normally commanded as closely as possible to that angle which would produce maximum level of brake torque (MBT) production from the engine, there is no opportunity to provide a torque increase using spark angle. Another problem related to moving the spark angle away from MBT timing for the purpose of torque modulation is that the efficiency of combustion is lower as more fuel is converted to heat rather than used to produce torque. This results in a slight fuel economy degradation for the vehicle. Finally, by moving away from MBT timing, there is an increase in the emissions produced by the engine as less of the fuel is burned in the cylinder.

The addition of electric motor 442 to the drive line provides an additional option for achieving torque modulation during shifting. Electric motor 442 provides several advantages over spark timing when used for torque modulation. Given that the normal request from transmission controller 448 is for torque reduction, electric motor 442 may achieve the torque reduction by providing a positive charging current to the battery. Whereas spark modification results in a net energy loss in the system, use of motor 442 results in an energy gain, thereby increasing fuel economy. In addition, motor 442 can be used to provide positive torque increases if requested by the transmission 440. Such a torque increase is not readily available from typical spark timing control due to the use of MBT spark timing. The availability of positive torque modification potentially results in smoother shifts. Because motor 442 has a response time similar to that of spark timing control, no adverse delay is introduced.

For these reasons, it is desirable to use motor 442 for torque modulation whenever possible. There are a few limitations related to motor 442 that must be taken into account. For example, the available torque from motor 442 can be limited by several factors including motor temperature, battery state of charge, motor speed, and the like. In cases where motor torque is limited to less than the requested torque, a combination of spark and motor torque may be used. The torque command for motor 442 is expressed in Equation 1 as follows:

$$\tau_{mot\_req} = \min(\tau_{mot\_avail\_max}, \max(\tau_{mot\_avail\_min}, (\tau_{desired\_fast} - \tau_{eng\_base}))), \quad (1)$$

where $\tau_{mot\_req}$ is requested motor torque 638, $\tau_{mot\_avail\_min}$ is the minimum available motor torque 634, $\tau_{desired\_fast}$ is the arbitrated, desired torque from all fast requesters 622, and $\tau_{eng\_base}$ is a feedback signal from engine controller 444, represented by estimated base engine torque 620. To cover the event when motor 442 is used to temporarily increase torque, requested motor torque 638 is also limited by the maximum availability of motor 442, expressed as $\tau_{mot\_avail\_max}$ 632. The corresponding command for engine 436 is expressed in equation 2 as follows:

$$\tau_{eng\_req\_fast} = \tau_{desired\_fast} - \tau_{mot\_req}, \quad (2)$$

where $\tau_{eng\_req\_fast}$ is requested fast engine torque 246 achieved with spark timing control. Under this definition, engine controller 444 commands fast actuators such as spark timing and fuel to meet requested fast engine torque 246.

Another scenario that can benefit from the present invention is traction control torque reduction. Similar to shift quality function, traction control requires a fast torque response. However, this response can be a more prolonged event depending upon the road surface. The present invention applies for limiting both base and fast torque requests while traction is compromised. In this case, motor torque provides the transient difference between the actual and the requested base engine torque.

Figure 10:
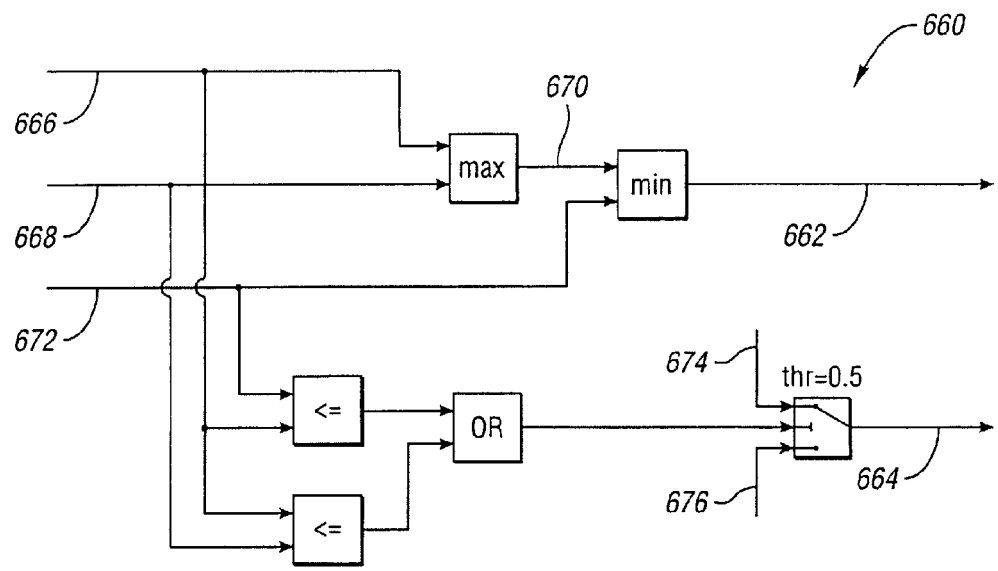
FIG. 10 is a block diagram illustrating arbitration among base requests at the wheel level according to an embodiment of the present invention.

Referring now to FIG. 10, a block diagram illustrating arbitration among base requests at the wheel level according to an embodiment of the present invention is shown. A wheel level arbiter, shown generally by 660, generates arbitrated, desired wheel force 662 and arbitrated force winner 664 indicating which base request was selected by wheel level arbiter 660. Wheel level arbiter 660 accepts driver desired wheel force 666 and cruise control desired wheel force 668. Driver desired wheel force 666 is based on position of the accelerator pedal. Cruise control desired wheel force 668 is requested to maintain vehicle 430 at a constant speed or other set-point. Intermediate desired wheel force 670 is the maximum of driver desired wheel force 666 and cruise control desired wheel force 668. Arbitrated desired wheel force 662 is the minimum of intermediate desired wheel force 670 and vehicle speed wheel force limit 672, which is based on vehicle speed limitation.

In addition to generating arbitrated demand 662, wheel level arbiter 660 outputs arbitrated force winner 664 providing an indication as to the source of arbitrated desired wheel force 662. Torque limit speed control indicator 674 and driver force indicator 676 are integer values indicating speed limiting and driver force, respectively. Arbitrated force winner 664 is set to torque limit speed control indicator 674 either if driver desired wheel force 666 is not greater than cruise control desired wheel force 668 or if vehicle speed wheel force limit 672 is not greater than driver desired wheel force 666.

Figure 11:
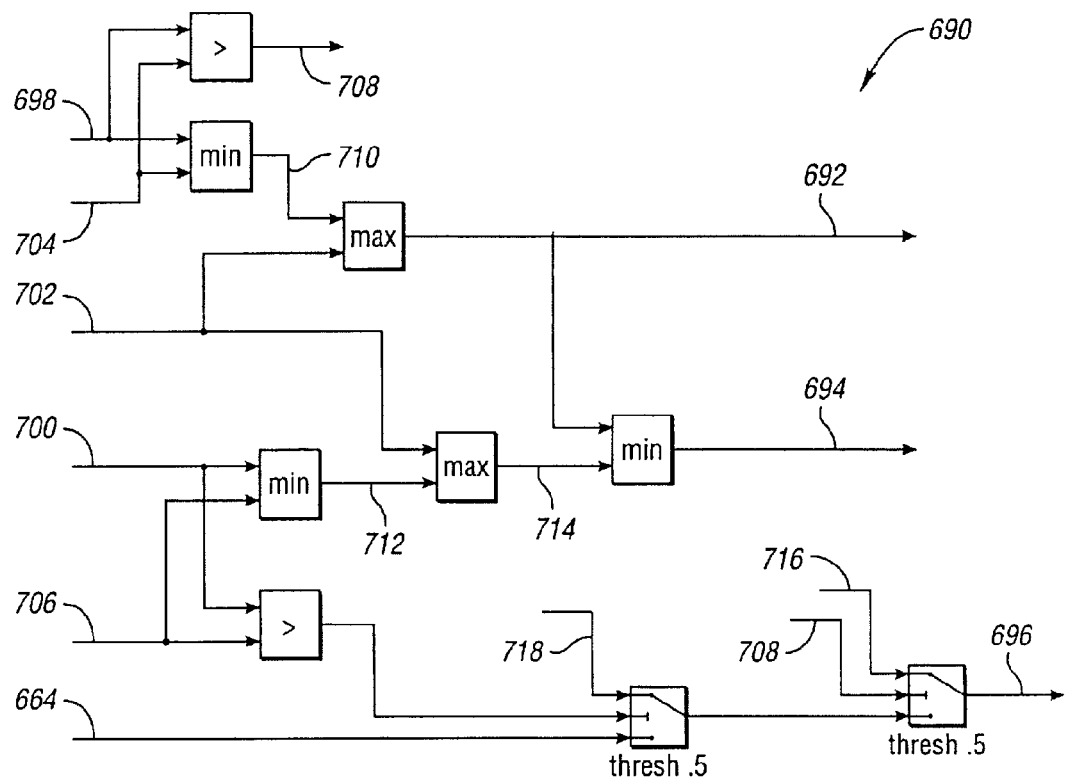
FIG. 11 is a block diagram illustrating arbitration at the transmission input level according to an embodiment of the present invention.

Referring now to FIG. 11, a block diagram illustrating arbitration at the transmission input level according to an embodiment of the present invention is shown. A transmission input level arbiter, shown generally by 690, generates arbitrated desired transmission input base torque 692, arbitrated desired transmission input fast torque 694 and arbitrated torque winner 696. Transmission input level arbiter 690 accepts a variety of inputs. Arbitrated desired transmission input base torque 692 and arbitrated desired transmission input fast torque 694 are translated based on the operation of transmission 440. Arbitrated force winner 664 indicates the winner of arbitrated requests occurring at wheel level 56. Fast torque shift limit 702 from transmission controller 448 requests torque limit during shift for better shift quality. Maximum base torque limit 704 and maximum fast torque limit 706 from transmission controller 448 are provided to protect against mechanical damage to transmission 440.

Transmission input level arbitrator 690 generates torque limit signal 708 as a binary control signal asserted when transmission input desired base torque 698 is greater than maximum base torque limit 704. Intermediate base torque request 710 is the minimum of transmission input desired base torque 698 and maximum base torque limit 704. Arbitrated desired transmission input base torque 692 is the maximum of intermediate base torque request 710 and fast torque shift limit 702. First intermediate fast torque request 712 is the minimum of transmission input desired fast torque 700 and maximum fast torque limit 706. Second intermediate fast torque request 714 is the maximum of first intermediate fast torque request 712 and fast torque shift limit 702. Arbitrated desired transmission input fast torque 694 is the minimum of second intermediate fast torque request 714 and arbitrated desired transmission input base torque 692.

Arbitrated torque winner 696 provides an integer indicating the source winning arbitration within transmission input level arbiter 690. Mechanical limit indicator 716 indicates limiting to protect transmission 440 from excessive base torque. Shift torque reduction indicator 718 indicates limiting due to modulation requested by transmission controller 448 during a shift event. Arbitrated torque winner 696 is set to mechanical limit indicator 716 when torque limit signal 708 is asserted. If this is not the case, arbitrated torque winner 696 is set to shift torque reduction indicator 718 if transmission input desired fast torque 700 is greater than maximum fast torque limit 706. Otherwise, arbitrated force winner 664 is sent as arbitrated torque winner 696.

Figure 12:
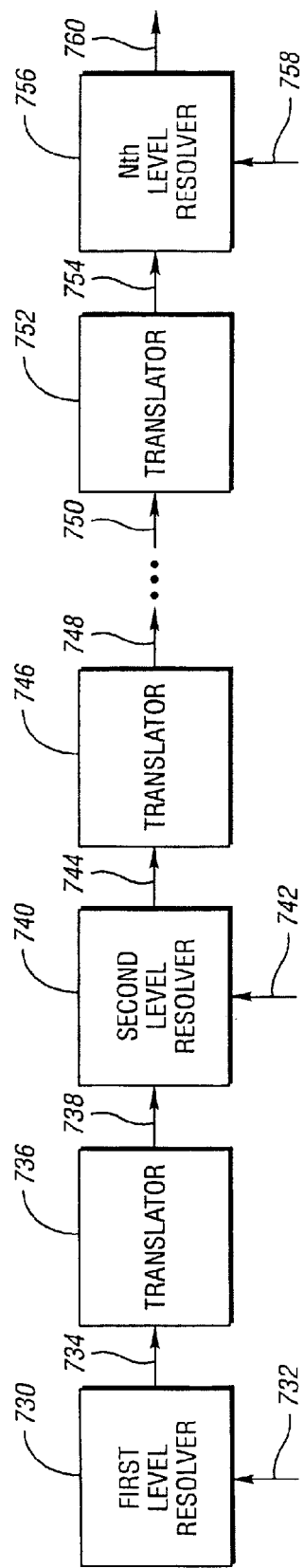
FIG. 12 is a block diagram illustrating multilevel torque resolution according to an embodiment of the present invention.

Referring now to FIG. 12, a block diagram illustrating multilevel torque resolution according to an embodiment of the present invention is shown. Torque resolution may be performed at any number of levels. In the generalized representation shown, first level resolver 730 arbitrates and/or coordinates first level torque input requests 732 to produce first level resolved torque requests 734. First level resolved torque requests 734 are translated by first level translator 736 to produce translated first level torque requests 738. Second level resolver 740 arbitrates and/or coordinates translated first level torque requests 738 and any second level torque input requests 742 to produce second level resolved torque requests 744. Second level resolved torque requests 744 are translated by second level translator 746 to produce translated second level torque requests 748. This process may be repeated to match the architecture of any drive train. Resolved $(n-1)^{st}$ level torque requests 750 are translated by $(n-1)^{st}$ translator 752 to produce translated $(n-1)^{st}$ level torque requests 754. An $n^{th}$ level resolver 756 accepts translated $(n-1)^{st}$ level torque requests and any $n^{th}$ level torque input requests 758 to produce $n^{th}$ level resolved torque requests. At any level, torque input requests 732, 742, 758 may be generated by torque requestors operating on that level and/or from torque requests translated from another level.

Various multilevel systems are possible. For example, a planetary gear set can have a different level for each of the sun gear, the planet gear carrier and the annulus rotations.

Another example is a three level system including a transmission input level, a differential input level and a wheel level. An engine and/or motor operates at the transmission input level. An electric motor is coupled to the drive shaft at the differential input. One or more additional motors or other torque producing devices operate at the wheel level.

While embodiments of the invention have been illustrated and described, it is not intended that these embodiments illustrate and describe all possible forms of the invention. For example, the present invention may be applied to nonautomotive systems. It should be understood that the words used in the specification are words of description rather than limitation and that various changes may be made without departing from the spirit and scope of the invention.

What is claimed is:

1. A method for use in an automotive vehicle having an engine and at least one motor, the method comprising:
    receiving an engine base torque level indicating slowly changing torque produced by the engine;
    receiving a request for fast desired torque;
    determining as a motor torque a difference between the fast desired torque and the engine base torque level;
    determining as an engine fast torque a difference between the request for fast desired torque and the motor torque;
    determining a motor torque request as the motor torque; and
    determining an engine torque request as the engine fast torque.

2. The method according to claim 1 wherein determining the motor torque further comprises limiting the difference by at least one motor torque availability limitation.

3. The method according to claim 1 wherein the engine torque request is determined as a base engine torque request if the base engine torque request is less than the engine fast torque.

4. The method according to claim 1 further comprising limiting the motor torque with at least one motor slew rate limitation prior to determining the engine fast torque.

5. The method according to claim 1 further comprising receiving an indicator as to a source of the request for fast desired torque.

6. The method according to claim 5 further comprising:
    receiving a request for intended motor torque; and
    determining the motor torque request as the request for intended motor torque if the source of the request for fast desired torque does not match one of the at least one allowable fast desired torque requesters.

7. The method according to claim 5 further comprising determining the motor torque request as the motor torque only if the source of the request for fast desired torque matches one of at least one allowable fast desired torque requesters.

8. The method according to claim 5 further comprising:
    receiving a base engine torque request; and
    determining the engine torque request as the base engine torque request if the source of the request for fast desired torque does not match one of the at least one allowable fast desired torque requesters.

9. The method according to claim 5 wherein the at least one allowable fast desired torque requesters comprises a traction control torque request.

10. The method according to claim 5 wherein the at least one allowable fast desired torque requesters comprises a transmission torque modulation request.

11. A vehicle comprising:
    an engine supplying engine torque to drive the vehicle, the engine torque based on an engine torque request;
    at least one motor supplying motor torque to drive the vehicle, the motor torque based on a motor torque request;
    a plurality of torque requesting sources; and
    control logic in communication with the engine, the at least one motor and the plurality of torque requesting sources, the control logic operative to
    (a) receive an engine base torque level indicating slowly changing torque produced by the engine,
    (b) receive a request for fast desired torque,
    (c) determine as a motor torque a difference between the fast desired torque and the engine base torque level, this difference limited by at least one motor torque availability limitation,
    (d) determine as an engine fast torque a difference between the request for fast desired torque and the motor torque,
    (e) determine as the motor torque request the motor torque, and
    (f) determine as the engine torque request the engine fast torque.

12. The vehicle according to claim 11 wherein the engine torque request is determined as a base engine torque request if the base engine torque request is less than the engine fast torque.

13. The vehicle according to claim 11 wherein the control logic limits the motor torque with at least one motor slew rate limitation prior to determining the fast engine torque.

14. The vehicle according to claim 11 wherein the control logic receives an indicator as to a source of the request for fast desired torque.

15. The vehicle according to claim 14 wherein the control logic is further operative to determine as the motor torque request the motor torque if the source of the request for fast desired torque matches one of at least one allowable fast desired torque requesters.

16. The vehicle according to claim 14 wherein the control logic is further operative to determine as the motor torque request the request for intended motor torque if the source of the request for fast desired torque does not match one of the at least one allowable fast desired torque requesters.

17. The vehicle according to claim 14 wherein the control logic is further operative to:
receive a base engine torque request; and
determine as the engine torque request the base engine torque request if the source of the request for fast desired torque does not match one of the at least one allowable fast desired torque requesters.

18. The vehicle according to claim 14 wherein the at least one allowable fast desired torque requesters comprises a traction control torque request.

19. The vehicle according to claim 14 wherein the at least one allowable fast desired torque requesters comprises a transmission torque modulation request.

20. A method for controlling a motor vehicle having a plurality of torque producing sources for propelling the vehicle, the method comprising:

receiving a base torque level indicating slowly changing torque produced by a first propelling torque source;

receiving a request for fast desired torque;

determining a second propelling source torque request based on a difference between the fast desired torque and the base torque level, this difference limited by at least one second propelling torque source availability limitation;

determining a first propelling source torque request based on a difference between the request for fast desired torque and the second propelling torque source request; and providing the first propelling source torque request and the second propelling torque source request to the plurality of torque producing sources, whereby the motor vehicle is controlled.

* * * * *